United States Patent [19]

Hebert

[11] Patent Number: 5,009,779
[45] Date of Patent: Apr. 23, 1991

[54] MAGNETIC ELEMENT WITH MAGNESIUM COIL FOR FILTER

[76] Inventor: Alfred M. Hebert, P.O. Box 706, Pleasant Valley, N.Y. 12569

[21] Appl. No.: 448,533

[22] Filed: Dec. 11, 1989

[51] Int. Cl.⁵ .......................... B01D 35/06; B03C 1/30
[52] U.S. Cl. .................................... 210/223; 210/444; 210/541; 210/DIG. 17
[58] Field of Search ............ 210/168, 222, 223, 416.5, 210/444, 695, DIG. 17, 541; 123/196 A; 184/6.25; 335/305

[56] References Cited

U.S. PATENT DOCUMENTS

| | | | |
|---|---|---|---|
| 1,602,935 | 10/1926 | Rasey | 210/223 |
| 2,690,842 | 10/1954 | Splurak | 210/94 |
| 2,760,637 | 8/1956 | Franch | 210/223 |
| 2,795,333 | 6/1957 | Kennedy | 210/223 |
| 2,893,561 | 7/1959 | Duzich | 210/223 |
| 2,980,257 | 4/1961 | Paton | 210/223 |
| 2,983,384 | 5/1961 | Winslow | 210/223 |
| 3,072,266 | 1/1963 | Szwargulski et al. | 210/223 |
| 3,279,607 | 10/1966 | Michaelson | 210/223 |
| 3,342,339 | 9/1967 | Riolo | 210/223 |
| 3,727,761 | 4/1973 | Aspinwall et al. | 210/223 |
| 4,218,320 | 8/1980 | Liaw | 210/223 |
| 4,501,660 | 2/1985 | Hebert | 210/223 |

Primary Examiner—W. Gary Jones
Attorney, Agent, or Firm—Martin J. Spellman, Jr.

[57] ABSTRACT

The invention is an element for spin-on filters for removing metallic fines from the medium being filtered and for neutralizing sulphuric acids therein comprises a base element having a lower recess for a magnet and an upper recess larger than the lower recess. Extender elements are stackable on the base element and an upper container within which are placed magnets spaced apart by flux spacer elements is nested in the uppermost extender element. A magnesium coil is on the exterior of the container.

2 Claims, 3 Drawing Sheets

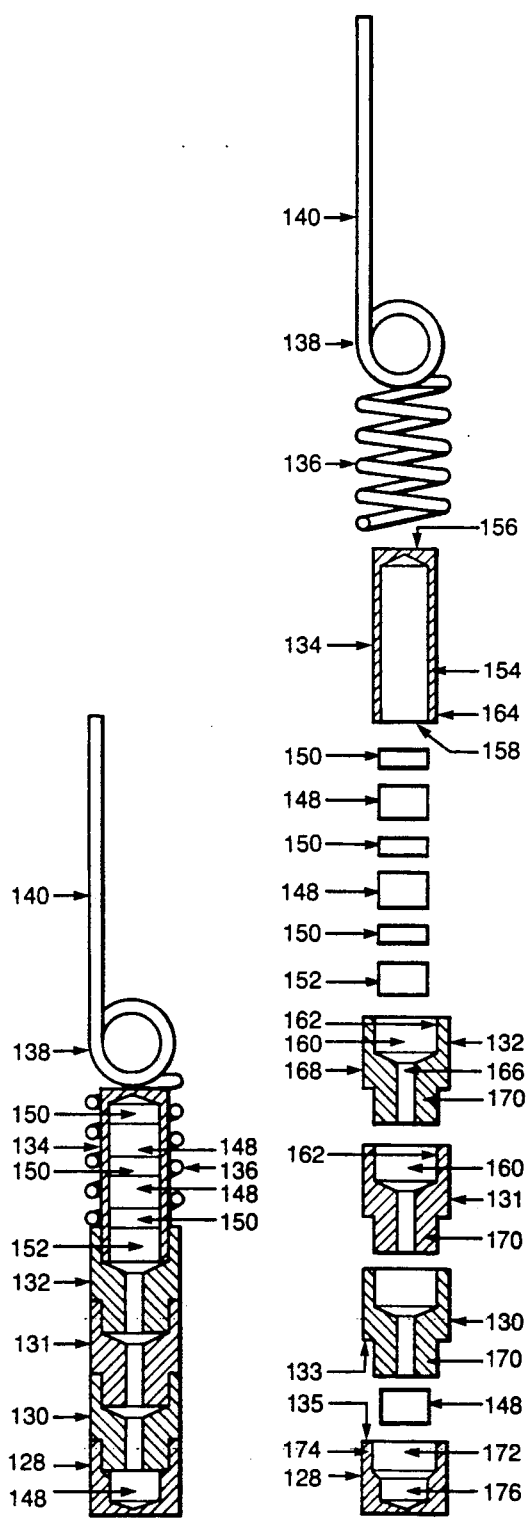
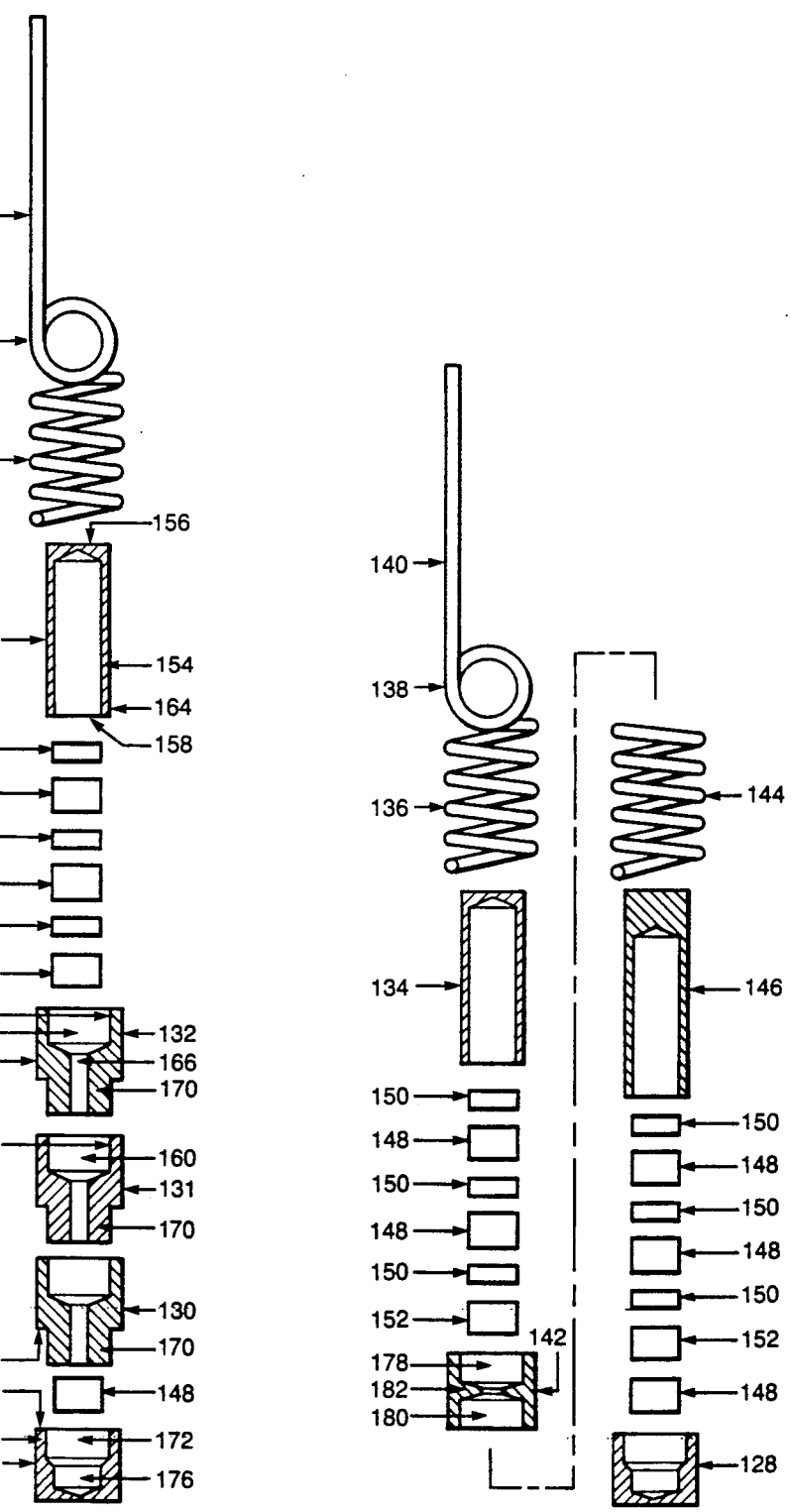
Fig. 6    Fig. 7    Fig. 8

MAGNETIC ELEMENT WITH MAGNESIUM COIL FOR FILTER

BACKGROUND OF THE INVENTION

1. Field Of The Invention

The present invention relates to machine and engine lubrication oil filters, and spin on type filters generally used on heavy duty equipment hydraulic systems, transmissions and the like.

It is well known that proper lubrication of machines and engines is perhaps the most critical routine step which can protect them from wear and greatly extend their useful life Lubricating oil, besides performing its lubricating and cooling functions in the engine, serves to remove acids and other impurities as well as wear residues. They are conventionally removed by filtering elements through which the lubricating oil is continuously circulated and by replacing the lubricating oil with new oil at frequent intervals during the utilization of the engine.

Experience has shown that the filtering elements do not always effectively remove fine metallic particles from the oil medium and that dilution of acids by the volume of the lubricating oil is insufficient to prevent noticeable corrosion of the metal in the engine which accelerates wear. In addition, the fine metallic particles accelerate the clogging of the filtering elements by all-embracing thereon and if they are dislodged from the paper filter element in agglomerated form, they tend to cause more engine damage than if they are uniformly disbursed throughout the volume of oil.

Various attempts have been made to incorporate magnetized particles in the filtering element or to place sheets of magnetized metal within the filter elements. Such approaches complicate the manufacture of the filtering elements and add greatly to the expense of replacing the filter element.

Other attempts have been made to incorporate magnetic means within the oil filter system by utilizing annular blocks at the base of the filter which have limited surface areas for contact with the circulating oil.

2. Prior Art

A vehicle oil filter is disclosed in U.S. Pat. No. 2,980,257 Paton wherein a circular block with a central aperture is provided in the lower portion of the filter casing. The block is formed of a composite of magnetic material and a mass of magnesium metal as an insert. The object is to both collect the ferrous metallic particles and to attempt to neutralize the action of sulfuric acid in the oil. The location at the base of the filter element is such that the oil briefly contacts the inserts, but the limited surface area and restricted position makes the device less than satisfactorily effective in performing its functions.

U.S. Pat. No. 3,279,607 Michaelson shows an oil filter cartridge wherein bars of magnetized material and bars of magnesium are placed in the folds of a corrugated filtering element in an attempt to remove metallic particles and neutralize sulfuric acid as in the Paton reference. The incorporation of the bars or plates within the folds of the filter element limits their effectiveness, particularly if they are not inserted in all of the folds. To do so however, would obviously greatly increase the cost and complexity of the manufacturing of the filter elements which are generally of a disposable nature and of nominal cost.

A magnetized helical coil to remove metallic particles from the oil is located externally of the filtering elements in U.S. Pat. No. 3,727,761 Aspenwall et al. in a complicated hydraulic filter structure.

Also of interest in U.S. Pat. No. 2,893,561 Duzich which discloses various sheet paper or batts of fibrous filter elements in which magnetized particles are diffusely located in order to attract metallic particles from the oil being filtered.

In U.S. Pat. No. 4,218,320 Liaw, an oil filter is disclosed in which an attached accessory wrap of either an electro-magnet or permanent magnet is wound around the main body of the filter in order to attract fine iron particles to it to prevent them from penetrating the rolled filter element. This device serves to lengthen the duration of the usefulness of the filter paper. It is would externally of the outer side of the filter can body and does not come in contact with the lubricating oil.

U.S. Pat. No. 3,342,339 Riolo disclosed a conventional casing structure with permanent magnets fixedly incorporated into the filter structure.

U.S. Pat. No. 2,795,333 Kennedy relates to a fuel filer and discloses a spring used to retain a treating element.

Additional prior references of interest are:

| | | |
|---|---|---|
| 1,602,935 | 10/1916 | Rasey |
| 2,690,842 | 10/1954 | Spulvak |
| 2,760,637 | 8/1956 | Franch |
| 2,983,384 | 5/1961 | Winslow |
| 3,072,260 | 1/1963 | Szwargulski |

My prior patent U.S. Pat. No. 4,501,660 provided a significant improvement over the devices of the foregoing references.

U.S. Pat. No. 4,501,660 discloses, in one embodiment, which in practical experience appears to be the preferred embodiment, an automotive lubricating oil filter device comprising a main container body having inlets and outlets for the lubricating oil to be filtered, and a cylindrical filtering element through which the oil is filtered from the outer portion of the body inwardly to a central cylindrical core. The core contains a magnesium metal helical structure within which is enclosed one or more longitudinal bars of magnetized metal.

The magnesium helical structure serves to neutralize sulfuric acid generated in the engine and the magnetized metal bars serve to remove fine metallic particles from the lubricating oil, preventing agglomoration on the filtering element, in addition to preventing engine wear. The structure comprising the helical magnesium metal and magnetized metal bars contained therein can be removed and cleaned to be regenerated without requiring disposal of the main filtering element or structure and vice versa.

The magnesium helix and magnetic bar structure combination utilized according to my patent U.S. Pat. No. 4,501,660 is sized for each size filter structure in which it is utilized in order to fit properly within the filter structure and so that the upper extended terminus of the helix does not extend too far into the engine or other structure to which it is secured when operatively joined to the input and output channels through which circulate the medium to be filtered.

The cost of manufacturing the magnesium helix and magnetized metal bar structure combination for use in various sized filters structure has been unnecessarily high because in general a different sized helix and bar structure was required for each different sized filter structure.

In addition, while the helix and bar structure of my prior patent could be regenerated by removing it from the filter structure and wiping the bars clean of metallic fines this was somewhat awkward because of the construction wherein the bars were totally surrounded by the helix. In practice it was also found that the metallic fines were attracted primarily only near the ends of the bar magnets and that much of the surface area of the magnetic bars did not collect fines.

SUMMARY OF THE INVENTION

It is an object of the present invention to provide an improved spin-on oil filter structure of the type referred to above which provides an assembly of the magnesium helix and magnetic metal combination which is readily adapted for utilization in different sized spin-on filters, is easily disassembled for cleaning and removing of accumulated metallic fines, and wherein the magnetic pull of the core portion is more evenly distributed along its longitudinal length as opposed to being concentrated primarily at its ends as in the prior development. Such structures are intended for use in spin-on type filters for crank case lubricant and such filters which are used in heavy duty transmission and hydraulic systems.

The oil filters to which this invention is directed are as in U.S. Pat. No. 4,501,660 those which compromise an outer container member in cylindrical form, closed at the other end thereof. The container is provided with inlet and outlet means at the inner end thereof which end is attached to the engine block or transmission in a conventional manner. Oil from the engine or transmission flows from the region of the internal walls of the outer container through a filtering unit which is comprised of multiple wrapped layers, fibrous batt, or accordion pleated sheets as is well known. The oil flows towards the cylindrical central core and from there returns to the engine/transmission through a central outlet.

Within the cylindrical central core of the filter inward of the filtering element in my patent U.S. Pat. No. 4,501,660 there was provided a helix structure of magnesium metal which rested on and extended from the outer end of the container member the length of the filter with the terminus of the helix extending into the central outlet to contact the oil as it is returned to the engine/transmission. Magnetic bars were enclosed within the helix.

In accordance with the present invention I have found that the magnesium helix coil portion may be shortened, but the outer end with the extended terminus is kept substantially the same length. The coiled portion of the helix is mounted on or about the upper portion of a cylindrical pedestal assembly that is readily adaptable to different lengths.

Within the adjustable pedestal assembly are retained at least two cylindrical or button magnets. The pedestal assembly which supports the helix and carries the magnets within it is comprised of an inert plastic such as nylon, acetal resins such as polyoxymethylene homopolymers and copolymers based on trioxane sole under the trademarks Delrin and Celcon, and polytetrafluoroethylene sold under the trademark Teflon and consists of a base, a central section, and top hollow cylinder, which when assembled together form an adjustable length pedestal containing cylindrical magnets and providing an adjustable height pedestal for the magnesium helix pedestal.

This pedestal is comprised of a hollow cylindrical base portion closed at the bottom end. The base provides a cylindrical space for receiving a cylindrically shaped defined space. Outwardly extending annular walls above the lower recess are formed to define a further space into which fits the bottom annular cylindrical portion of an extender member having the bottom portion joined at mid-point with a widened upper portion with a ledge which abuts the top of the walls of the base portion resting on a corresponding shoulder of the extender member.

Extender members may be successively joined together by frictional engagement with an adjacent extender member. The uppermost extender member receives the bottom portion of an upper cylindrical storage cylinder having an outer diameter slightly smaller than the inner diameter of the extender member. Within the cylinder are stored soft metal spacers arranged alternately with cylindrical magnets, which optionally may have like poles or opposite poles facing each other and normally are spaced apart by soft metal spacers comprised of a material such as Leadloy which serves both as a spacer and flux concentrator.

The outer diameter of the storage cylinder is the same or slightly smaller than the inner diameter of the helix coil and designed to be approximately the same length as the coil portion of the helix.

The pedestal, which as indicated, may have one or more intervening extenders or no extenders is thus an adjustable length pedestal that may be adapted to serve in spin-on filters of various sizes, the magnesium helix being the same size. The length of the coil extension is cut to appropriate length for each filter insertion. Inert cylindrical spacers may be used in lieu of some of the combination of cylindrical magnets and Leadloy spacers, depending upon the particular requirements and design of the filter in which the pedestal is to be employed.

The magnets may by way of example be comprised of neodymenium, ceramic, samarium or alnico. Samarium is preferred for effectiveness but is expensive.

This arrangement provides a readily adjustable pedestal which can easily be adapted to filters of varying sizes. It is generally centered at the bottom of the container by means of a bottom magnet in the base attracting it to the metal container base. The design also provides that the twisting removal of the helix serves to wipe the accumulated metallic fines from the smooth surface of the outer walls of the plastic cylindrical container within which is stored the magnets.

BRIEF DESCRIPTION OF THE DRAWING

In the accompanying drawing which forms a part of this specification:

FIG. 6 is a partial sectional view of the element structure of FIG. 4 along the longitudinal axis of the element of FIG. 4 from the left side thereof;

FIG. 7 is an expanded sectional view of the elements of FIG. 4 and 6;

FIG. 8 is an expanded partial sectional view of the element of the embodiment similar to that in FIG. 5 showing the assembly of components.

DESCRIPTION OF ILLUSTRATIVE EMBODIMENTS

Figure 1:
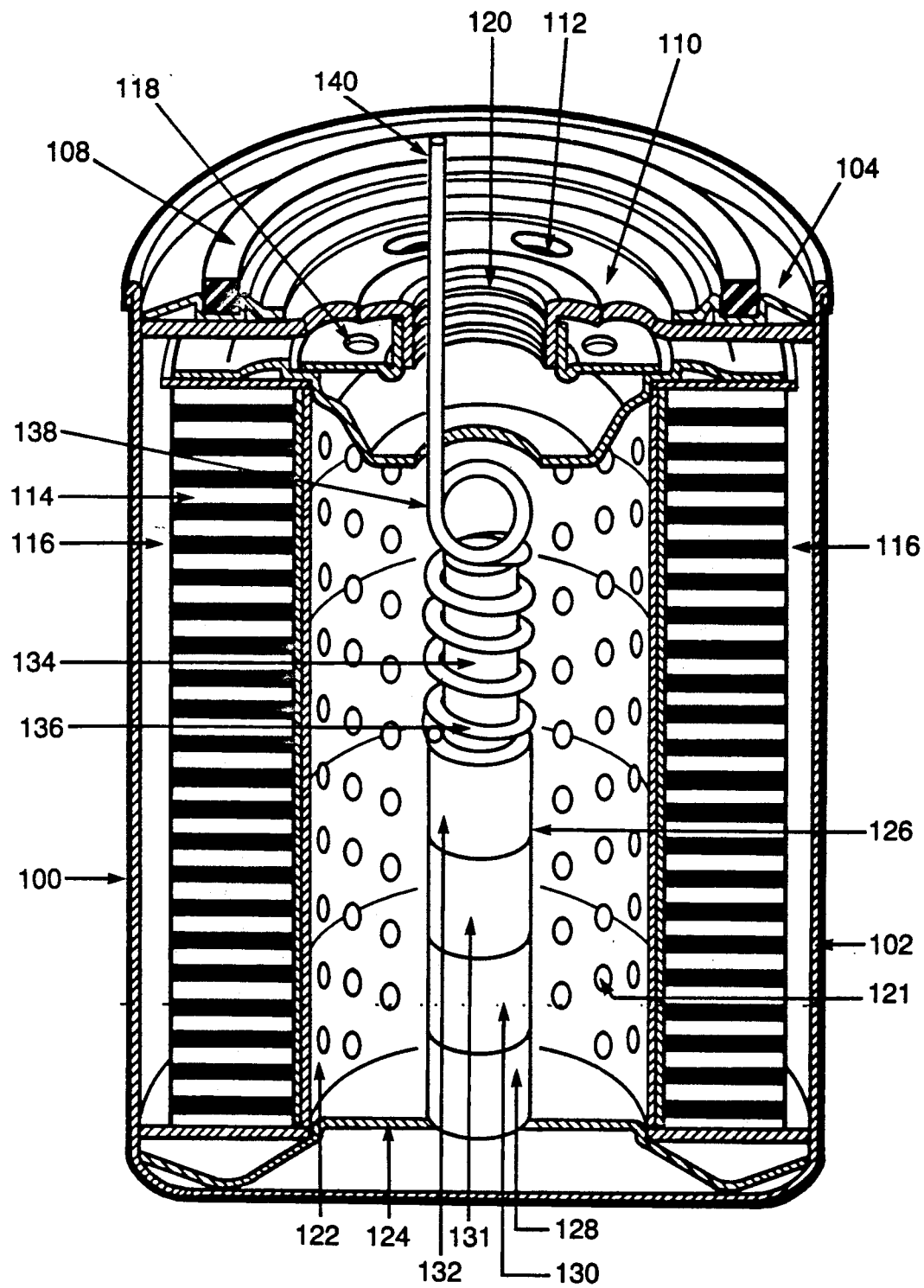
FIG. 1 is a cut away perspective view partially in section of an oil filter the magnetic body and coil of filter element structure of the present invention.
Figure 2:
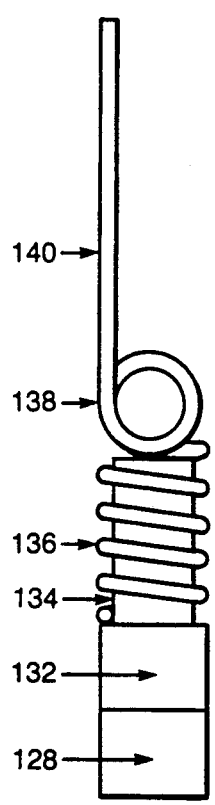
FIG. 2 is a plan view of one element structure according to the present invention.
Figure 3:
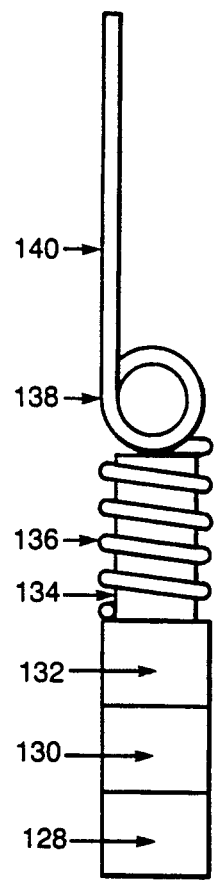
FIG. 3 is a plan view of the element of the present invention including two extender members.

Referring to the accompanying drawings in FIG. 1 the filter structure utilizing the adjustable pedestal structure of the present invention is shown with the pedestal in place maintained against the base of the filter structure by the magnetic attraction of magnets in the pedestal structure to the metal of the filter structure.

In FIG. 1, a typical oil filter is indicated at 100 and comprises an outer body shell 102 closed by a top 104; including a gasket 108 for sealing against the engine block. In inner section 110 of the top 104 inward of the gasket 108 are openings 112 for entry of oil from the engine block which then passes to the outer section 116 and then through paper filter element 114. Relief apertures 118 are provided to maintain circulation in the event the filter element 114 becomes clogged.

A threaded neck 120 serves as a means of attaching the filter 100 to the engine block in the usual manner.

Oil flowing from the outer section 116 through the paper filter element 114 passes through perforated apertures 121 in the inner cylindrical shell 122 past the element 126 and through threaded neck 120 back to the engine block.

The element 126 of the present invention rests on the metallic inner base 124 of the filter 100.

Figure 4:
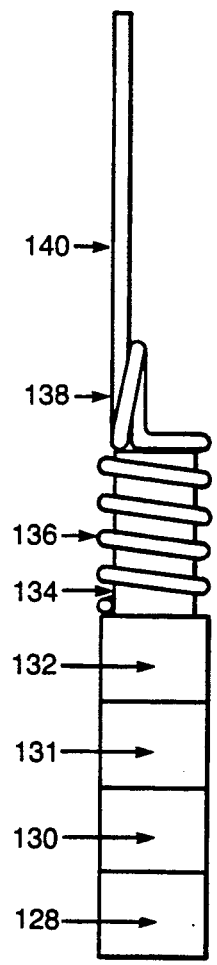
FIG. 4 is a plan view of the element structure according to the present invention with three extender members in place.

In the embodiment shown in FIGS. 1, 4 and 6, the element 126 illustrated comprises a base 128, extenders 130, 131 and extender 132 which also serves as the closure for a cylindrical magnet container 134.

Mounted on the exterior of the cylindrical container 134 is a coil 136 of magnesium metal having a loop 138 formed at the upper end thereof and an extension 140. The eye loop 138 facilitates twisting the helex coil 136 on and off the cylindrical member 134 for cleaning as discussed below.

The pedestal sections are manufactured of machinable polytetrafluoroethylene (Teflon) plastic such as nylon, Delrin, or Celcon which is resistant to the corrosive action of lubricating/hydraulic fluids and is stable within the temperature ranges normally encountered in lubricating or hydraulic systems in internal combustion engines. They may be machined or formed by injection molding.

Pedestal assemblies of the present invention are shown in FIGS. 6-8 which are cut away views along the central longitudinal axis of the cylindrical pedestal assembly 126. The cylindrical base member 128 of each has a closed annular bottom. The lower cylindrical chamber formed therein having a depth sufficient to accommodate an annular magnet 148. The upper chamber 172 of base 128 is defined by the annular outer walls 174 and accommodates the lower cylindrical extension portion 170 of the extender member 130. The upper surfaces of the walls 174 provide a ledge for the annular shoulder 133 of the extender 130. The interior of the walls 162 of extender 132, as do those of the other extenders 131 and 130, has a diameter only slightly greater than that of the external surface 164 of walls 154 of the storage cylinder 134. They are frictionally engaged to provide an enclosure to encase the series of Leadloy metal spacer discs 150, and intervening magnets 148 which are serially inserted in cylinder 143.

Over the outer surface 164 of wall 154 of the upper cylindrical container 134, the helix 136 is twisted on with the lower coils resting on the shoulders defined by the top of walls 160 of the extender 132.

The magnets 148 utilized in the base 128 and spaced apart in the cylindrical container 134 may be arranged north to north and north to south and as indicated, may be comprised of for example neodyminium, ceramic, samarium, or alnico, with samarium being preferred. A cylindrical plastic end plug 152 is used to close the end of container 134.

When the pedestal 126 is placed in the filter 100 as shown, the magnesium helix 136 neutralizes sulphuric acid in the oil and the magnetic field set up by the magnets causes the metallic fines suspended in the oil to be attracted to the outside walls of the pedestal structure 126 particularly on the upper cylindrical portions 134 and base 128.

The disposal of metallic fines after the pedestal 126 is removed from the filter 100 is facilitated when the helix 136 is twisted counterclockwise off the outer cylindrical walls of the cylinder 134 because it wipes off the accumulated fines, facilitating the regeneration of the pedestal combination. Because the assembled components of the pedestal structure 126 are of plastic material with a smooth finish, the fines are completely removed readily with a wiping cloth.

Figure 5:
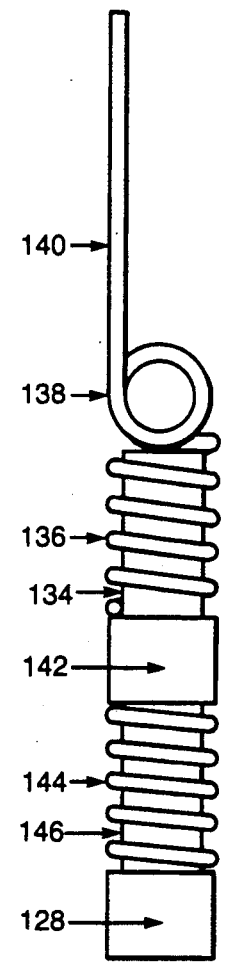
FIG. 5 has a plan view of the another embodiment including a coupler element, supplemental coil; and an additional cylindrical magnet container.

The embodiment shown in FIGS. 5 and 8 is particularly suitable for heavy duty applications and longer filters. In this case, an additional cylindrical container 146 is provided in lieu of some of the extended elements 130, 131 and 132 of the other embodiments and contains the Leadloy spacers 150, the magnets 148 and the inert cylindrical plastic end plug 152 in a manner similar to the arrangement of the container 134. The closed end of the cylindrical container 146 has a greater depth to it and it is frictionally press fitted into a cylindrical chamber 180 of the cylindrical container 142 supporting the containers 134 and 136.

In this embodiment the lower end of the container 134 is pressed into the upper annular chamber 178 of the coupling 142. The annular chambers 178 and 180 are spaced apart slightly by an inwardly extending ring 182 formed in the coupling 142.

The pedestal of this embodiment is also provided with an additional magnesium metal helix 144 which is slidingly mounted on the outside walls of the container 146. This embodiment provides additional magnesium surface for neutralizing acids as well as much greater magnetic pull for collecting fines.

As indicated, the invention provides an improved combination of magnesium helix and magnetic structure for utilization in spin filters for removing metallic fines from the lubricating oil and neutralizing sulphuric acid in the oil. Also the heights are readily adjustable, by removing or adding extenders so that the basic structure may be utilized in filters of various sizes. The arrangement of the magnets facilitates utilization of magnets of different composition and coil adjusting combination to achieve maximum efficiency, depending upon the temperature of the environment of the liquid to be filtered and the like.

Although the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. An element for spin-on filters for removing metallic fines from a medium being filtered and for neutralizing sulphuric acids therein, comprising a base element having a lower recess therein for a magnet and an upper recess larger than said lower recess, extender elements stackable on said base element, an upper container within which are placed magnets spaced apart by flux spacer elements, said container nesting in the uppermost extender element, and a magnesium coil on the exterior of said container.

2. An element for spin-on filters for removing metallic fines from a medium being filtered and for neutralizing sulphuric acids therein, comprising a cylindrical base element having a lower cylindrical recess therein for a cylindrical magnet and an upper recess of greater diameter than said lower recess, extender elements having the same external diameter as said base element and stackable therewith, an upper cylindrical container within which are placed cylindrical magnets spaced apart by cylindrical flux spacer elements, said container nesting in the uppermost extender element, coupling means connecting said upper container with an intermediate container also containing cylindrical magnets spaced apart by cylindrical flux spacer elements, and magnesium coils on the exterior of each of said containers.

* * * * *